US00RE42708E

(19) United States
(12) Reissued Patent
Mark et al.

(10) Patent Number: US RE42,708 E
(45) Date of Reissued Patent: Sep. 20, 2011

(54) SYSTEM FOR AVOIDANCE OF COLLISION BETWEEN AN AIRCRAFT AND AN OBSTACLE

(75) Inventors: Morten Mark, Oslo (NO); Rolf Bakken, Oslo (NO)

(73) Assignee: OCAS AS, Oslo (NO)

(21) Appl. No.: 12/685,117

(22) Filed: Jan. 11, 2010

Related U.S. Patent Documents

Reissue of:
(64) Patent No.: 7,136,011
Issued: Nov. 14, 2006
Appl. No.: 10/861,853
Filed: Jun. 4, 2004

U.S. Applications:
(63) Continuation of application No. 12/031,908, filed on Feb. 15, 2008, now Pat. No. Re. 41,153.

(30) Foreign Application Priority Data

Jun. 12, 2003 (NO) ..... 200332654

(51) Int. Cl.
*G01S 13/93* (2006.01)
*G01S 13/94* (2006.01)
*G08G 5/04* (2006.01)
*B64D 47/00* (2006.01)
*G01S 13/00* (2006.01)

(52) U.S. Cl. ..... 342/29; 342/27; 342/28; 342/52; 342/58; 342/60; 342/104; 342/118; 342/147; 342/175; 342/195; 701/3; 701/4; 701/8; 701/9; 701/300; 701/301; 340/945; 340/981; 340/983

(58) Field of Classification Search ..... 340/435, 340/945–983; 701/1, 3–18, 120–122, 300, 701/301; 342/22, 27–61, 104–115, 118, 342/145–147, 175, 195, 385, 386, 455, 352–358
See application file for complete search history.

(56) References Cited

U.S. PATENT DOCUMENTS 802,020 A 10/1905 Patten (Continued)

OTHER PUBLICATIONS

Luftfartskonferansen for ledende personell, Feb. 2002.

(Continued)

*Primary Examiner* — Bernarr E Gregory

(57) ABSTRACT

A field unit for warning of a danger of collision between an aircraft and an obstacle, in particular a topographical ground obstacle or an obstacle formed by a mast, building or aerial cable structure, comprises a multi-part tubular mast having devices for fixing a solar panel and a radar antenna; an elongate radar antenna in an environment-protective casing, which, with an electronics unit, forms a radar system for synthesized radar detection of an aircraft in a radar coverage area; a central processing unit for identifying on the basis of information from the radar system an aircraft which is in a zone of the radar coverage area and which on the basis of radar information such as direction, distance and/or speed computes a collision danger area; and a high-intensity light system and radio transmitter system that can be activated by the central processing unit upon detection of an aircraft in a collision danger area. The radio transmitter system may be a VHF or UHF radio transmitter system for providing a radio signal modulated by an audible warning signal, preferably a voice warning signal, whilst the light system preferably comprises a stroboscope light system. The field unit is arranged for communication with other similar field units for remote activation of light or audio warnings in a neighbouring field unit.

21 Claims, 17 Drawing Sheets

OCAS marker (Schematic)

U.S. PATENT DOCUMENTS

| | | | | | |
|---|---|---|---|---|---|
| 1,709,377 | A | | 4/1929 | Sperry | |
| 2,095,306 | A | | 10/1937 | Austin | |
| 2,212,110 | A | | 8/1940 | Beuermann | |
| 2,214,102 | A | | 9/1940 | Cumming | |
| 3,005,194 | A | * | 10/1961 | Goodell et al. | 342/29 |
| 3,725,934 | A | | 4/1973 | Ludlow | |
| 3,735,401 | A | | 5/1973 | Sakano et al. | |
| 3,760,416 | A | | 9/1973 | Barriere et al. | |
| 4,104,638 | A | | 8/1978 | Middleton | |
| 4,281,326 | A | * | 7/1981 | Anderson | 342/41 |
| 4,298,875 | A | | 11/1981 | Sullivan | |
| 4,646,244 | A | | 2/1987 | Bateman et al. | |
| 4,755,818 | A | | 7/1988 | Conrad | |
| 4,835,537 | A | | 5/1989 | Manion | |
| 5,157,615 | A | * | 10/1992 | Brodegard et al. | 701/301 |
| 5,252,978 | A | | 10/1993 | Priestley | |
| 5,351,032 | A | | 9/1994 | Latorre et al. | |
| 5,400,008 | A | | 3/1995 | Toohey | |
| 5,663,720 | A | | 9/1997 | Weissman | |
| 5,760,686 | A | | 6/1998 | Toman | |
| 5,774,088 | A | | 6/1998 | Kreithen | |
| 5,818,355 | A | * | 10/1998 | Shirai et al. | 340/435 |
| 5,892,462 | A | | 4/1999 | Tran | |
| 5,936,552 | A | | 8/1999 | Wichgers et al. | |
| 5,979,586 | A | * | 11/1999 | Farmer et al. | 340/435 |
| 6,133,867 | A | * | 10/2000 | Eberwine et al. | 342/29 |
| 6,181,261 | B1 | | 1/2001 | Miles, Jr. et al. | |
| 6,271,768 | B1 | * | 8/2001 | Frazier et al. | 340/961 |
| 6,294,985 | B1 | | 9/2001 | Simon | |
| 6,469,664 | B1 | * | 10/2002 | Michaelson et al. | 342/357.13 |
| 6,538,581 | B2 | | 3/2003 | Cowie | |
| 6,708,091 | B2 | | 3/2004 | Tsao | |
| 6,762,695 | B1 | | 7/2004 | Eslambolchi et al. | |
| 7,206,697 | B2 | * | 4/2007 | Olney et al. | 701/301 |
| RE41,153 | E | * | 3/2010 | Mork et al. | 342/29 |

OTHER PUBLICATIONS

Post-OG Teletilsynet, Arsrapport 2000.

* cited by examiner

Types of warning:

High intensity light flashes about 40 times a minute on both sides of the span – starts 15 seconds before collision Voice/oral signal, received on the radio on board the flying object that is on collision course

SYSTEM FOR AVOIDANCE OF COLLISION BETWEEN AN AIRCRAFT AND AN OBSTACLE

Matter enclosed in heavy brackets [ ] appears in the original patent but forms no part of this reissue specification; matter printed in italics indicates the additions made by reissue.

*Notice: More than one reissue application has been filed for the reissue of U.S. Pat. No. 7,136,011. The reissue applications are application Ser. No. 12/685,117 (the present application), and application Ser. No. 12/031,908, now U.S. RE 41153.*

FIELD OF THE INVENTION

The invention relates to systems for avoidance of collision between an aircraft and an obstacle on the ground, and relates in particular to systems of this kind that comprise a radar device for detection of an aircraft in flight and a device for warning the operator of the aircraft of a possible collision obstacle that is in the vicinity of the aircraft.

BACKGROUND

Accidents in which planes or helicopters fly into power lines happen once or twice a year in Norway, and almost weekly in the USA. These accidents often result in the loss of human life and substantial material damage. The accidents are a clear indication that today's marking of power lines and other aerial obstacles is not good enough. Marking of aerial obstacles using a system for avoidance of collision between an aircraft and an obstacle, hereinafter called OCAS, can reduce the number of accidents of this type considerably.

U.S. Pat. No. 5,351,032 discloses a short-range radio system, wherein the system provides both audio and visual warnings to the pilot of an aircraft of an upcoming power line. The system comprises a small narrow-band transmitter which utilises power from the power line, wherein the narrow-band transmitter may be installed on top of a power line tower or within already existing warning balls on the power line. The narrow-band transmitter provides a continuous warning signal to aircraft that approach the deployed narrowband transmitter, and a receiver installed on board the aircraft capable of receiving the warning signal from the narrow-band transmitter will, upon receipt of the warning signal, trigger both an audio and a visual alarm to alert the pilot of the aircraft to the potential hazard. Thus, the system requires that a part thereof, in this case a systemadapted receiver, should be located in the aircraft, and will only be effective in warning aircraft that have a part of the system installed therein. Therefore, aircraft that do not have a receiver of this kind installed will not be able to take advantage of the possible warning that the narrow-band transmitter could give. Furthermore, the system does not include any means for determining the distance between the aircraft and the obstacle, and it will thus be a matter of chance whether the receiver in the aircraft picks up the warning signal at a short or a long distance, which may result in a warning that is too late or in an unnecessary warning to aircraft which are at a great distance, but nevertheless within the maximum range that is determined by the propagation potential of the radio waves, the presence or absence of noise sources and the sensitivity of the receiver in question.

Thus, it is an object of the present invention to provide a solution that can give a warning to an operator of an aircraft in order to prevent collision between an aircraft and an obstacle, which overcomes the drawbacks of the previously known solutions.

SUMMARY

The present invention provides a system for avoidance of collision between an aircraft and an obstacle, characterised by the features set forth in the attached independent patent claims.

Additional advantageous features of the invention are set forth in the attached dependent patent claims.

BRIEF DESCRIPTION OF THE DRAWINGS

In the following description, the present invention will be explained in more detail with the aid of examples and with reference to the attached drawings, wherein.

DETAILED DESCRIPTION OF THE PREFERRED EMBODIMENTS

Figure 1:
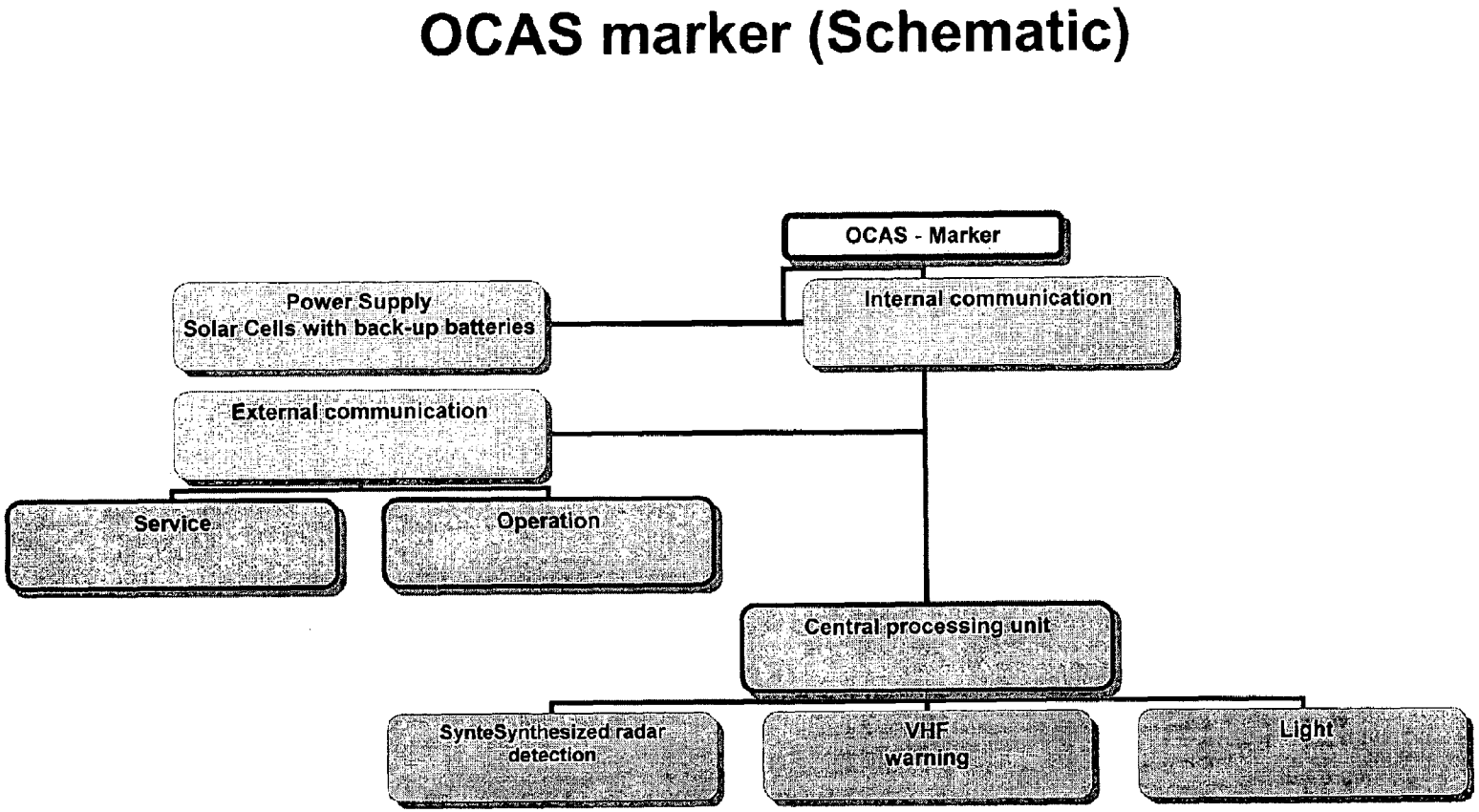
FIG. 1 is a structure chart showing the main elements of an OCAS system according to the invention.
Figure 2:
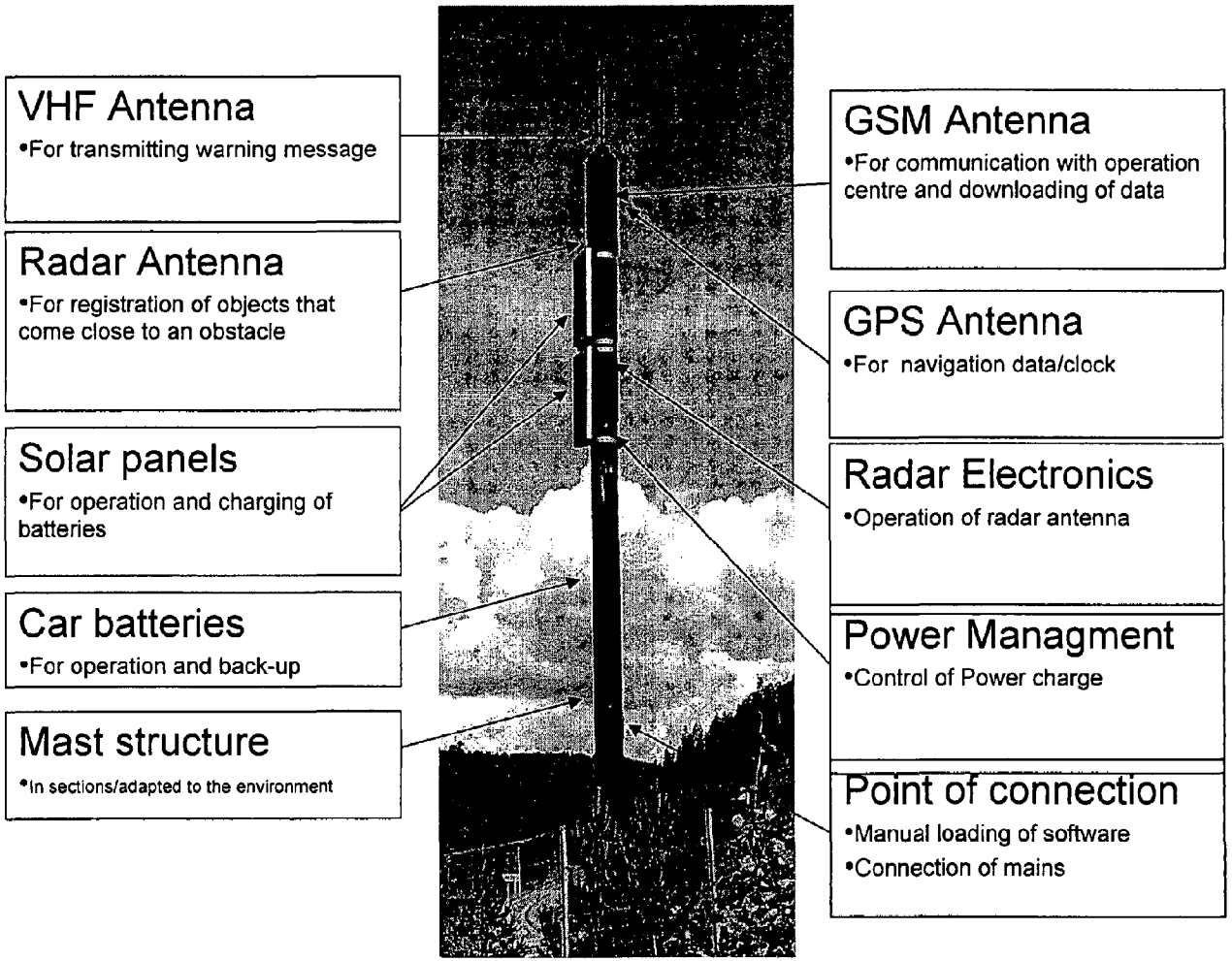
FIG. 2 is an illustration of an example of an OCAS unit according to the invention.
Figure 3:
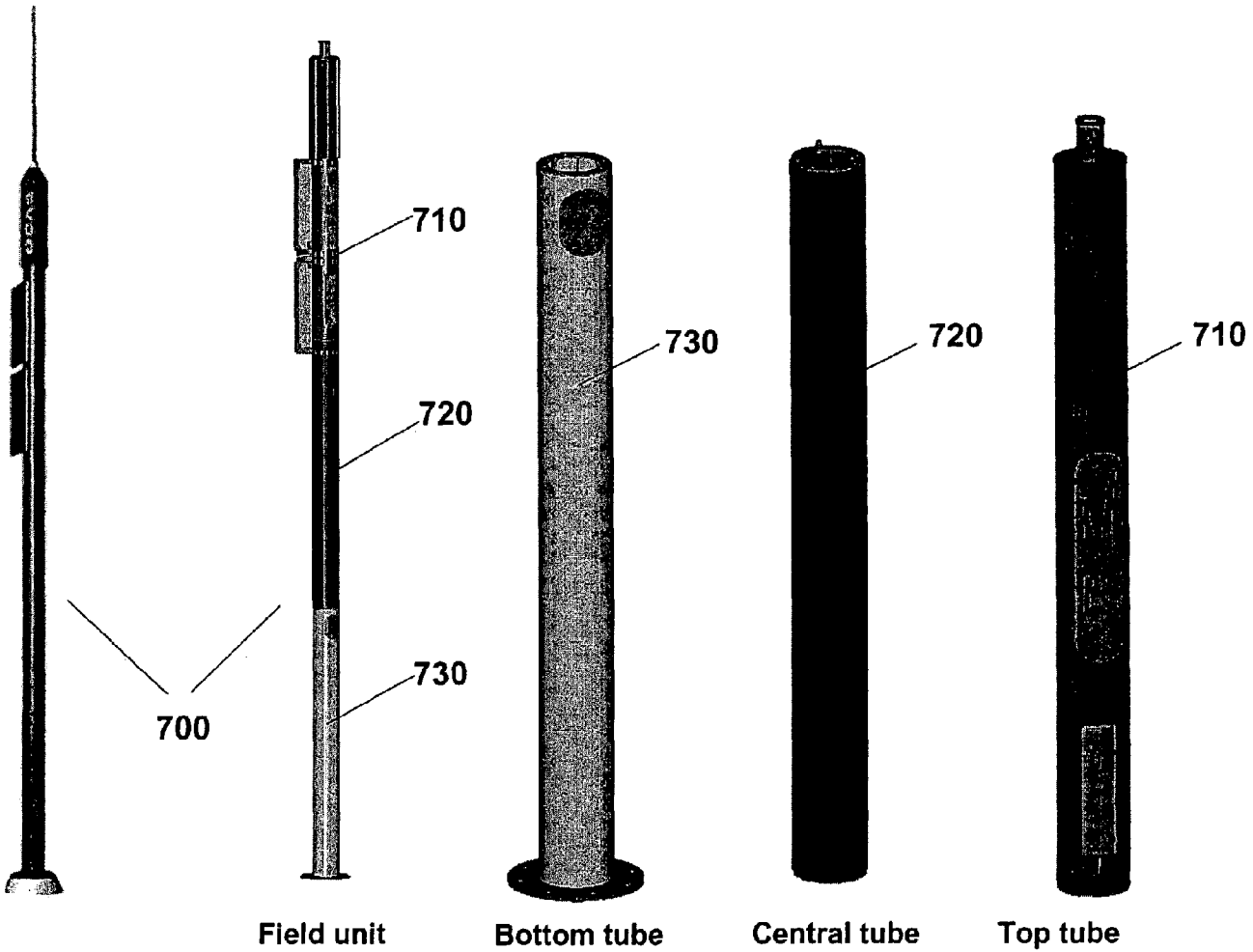
FIG. 3 shows an OCAS unit according to the invention and an embodiment of a mast that will be an integral part of an OCAS system.
Figure 4:
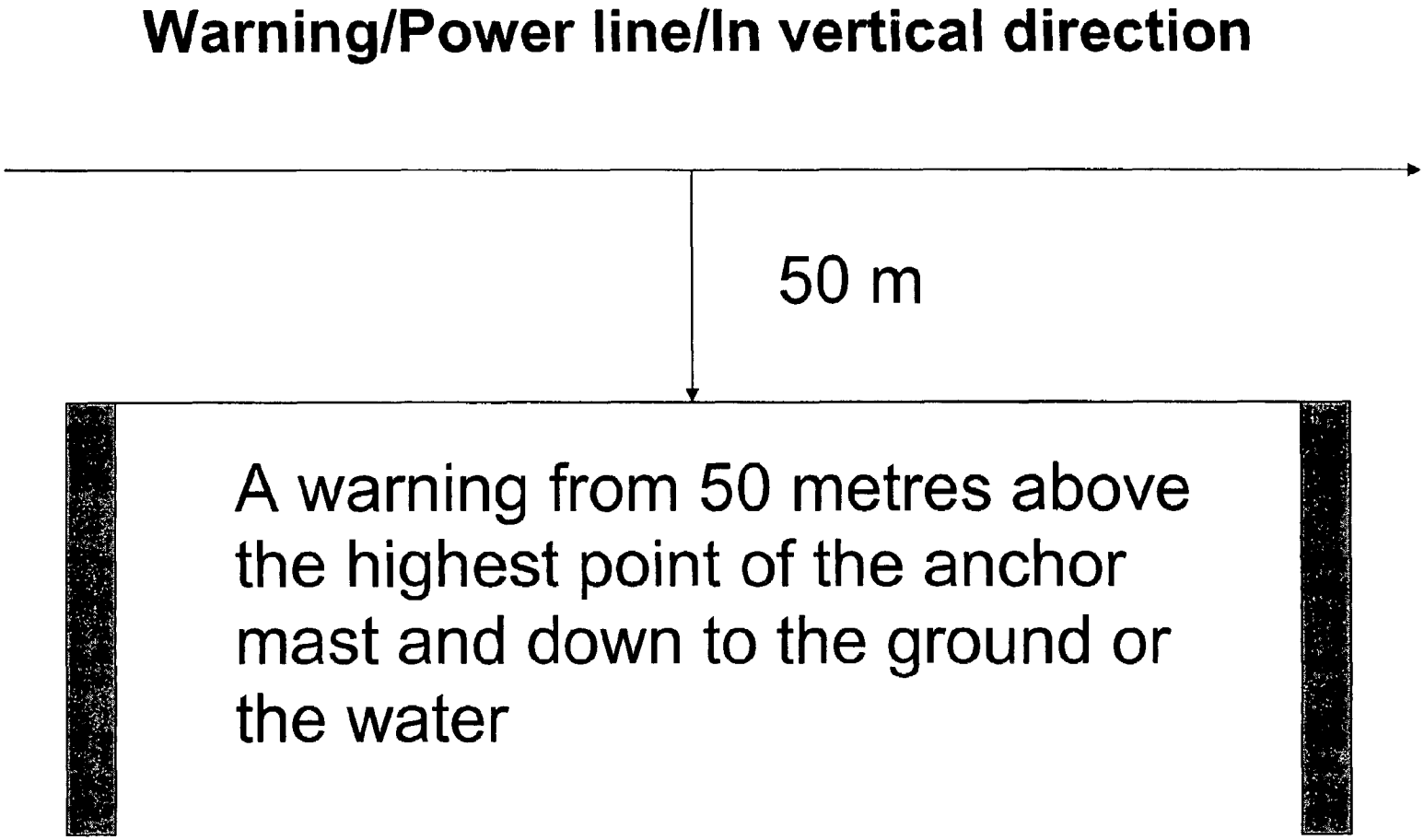
FIG. 4 is a schematic illustration of an example of the determining of a vertical warning boundary for an OCAS solution according to the invention.
Figure 5:
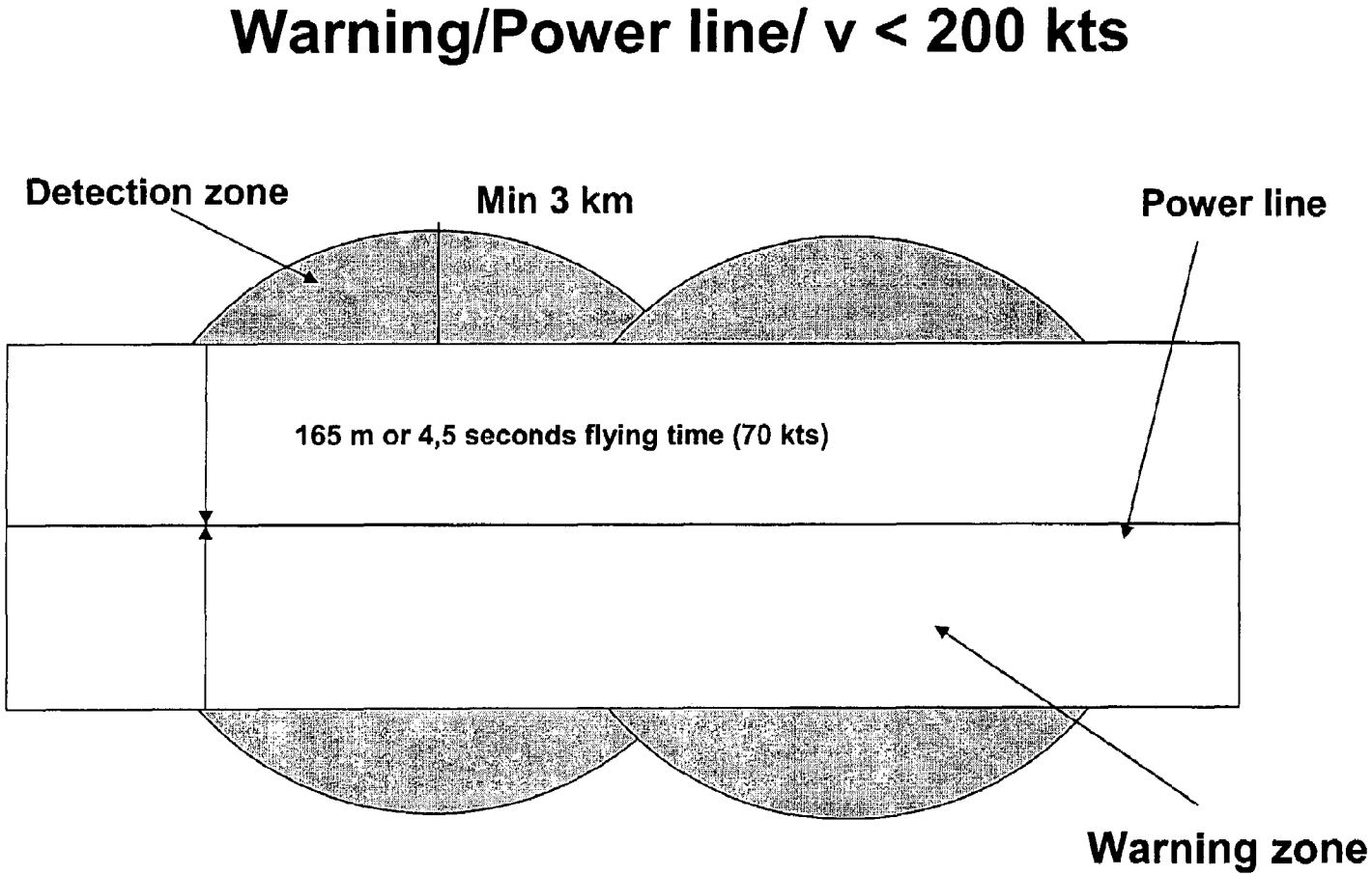
FIG. 5 is a schematic illustration of an example of detection and warning zones in an example of the utilisation of an OCAS system according to the invention to warn of a power line obstacle for aircraft travelling at a speed of less than 200 knots.
Figure 6:
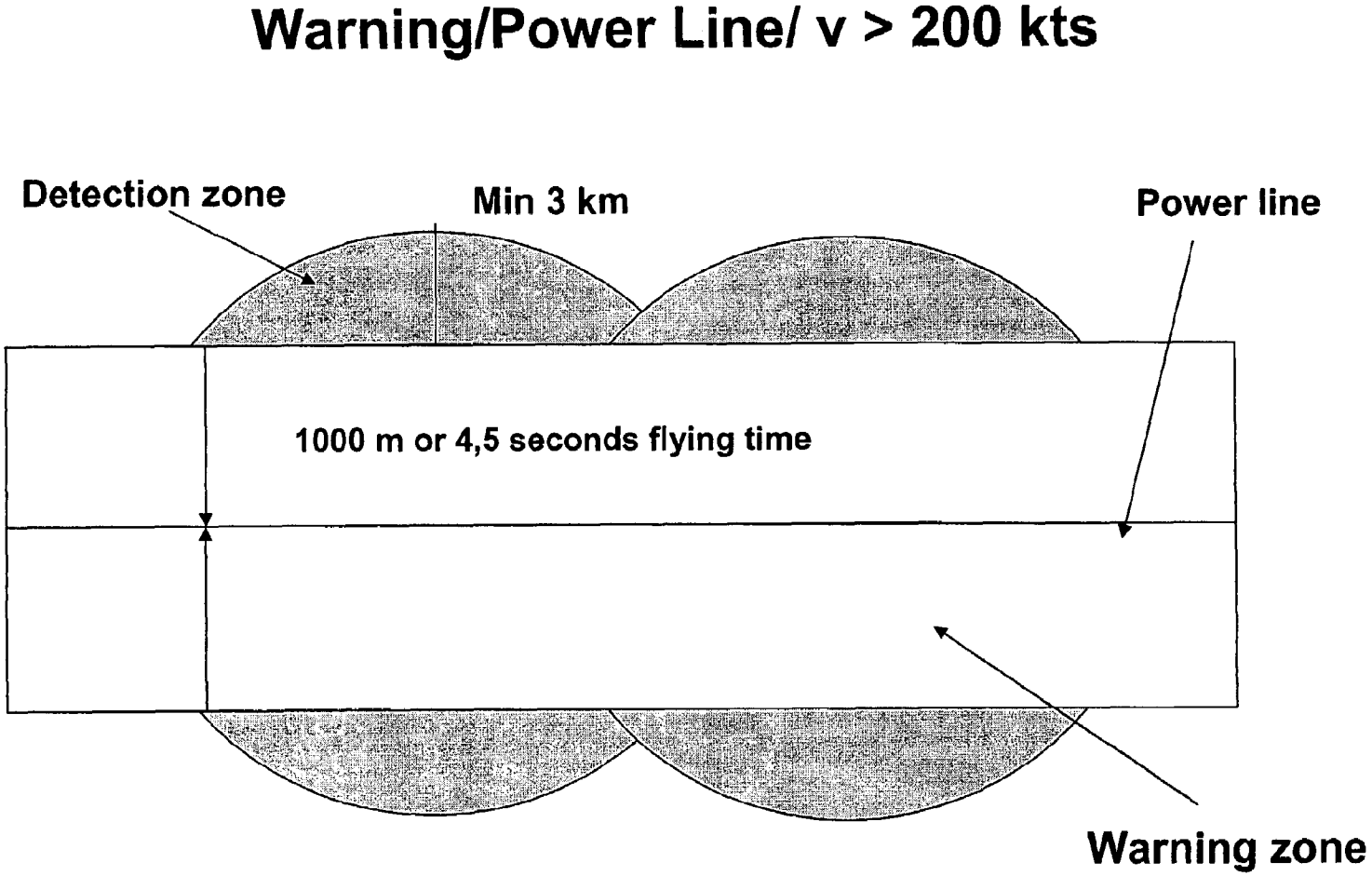
FIG. 6 is a schematic illustration of an example of detection and warning zones in an example of the utilisation of an OCAS system according to the invention to warn of a power line obstacle for aircraft travelling at a speed of more than 200 knots.
Figure 7:
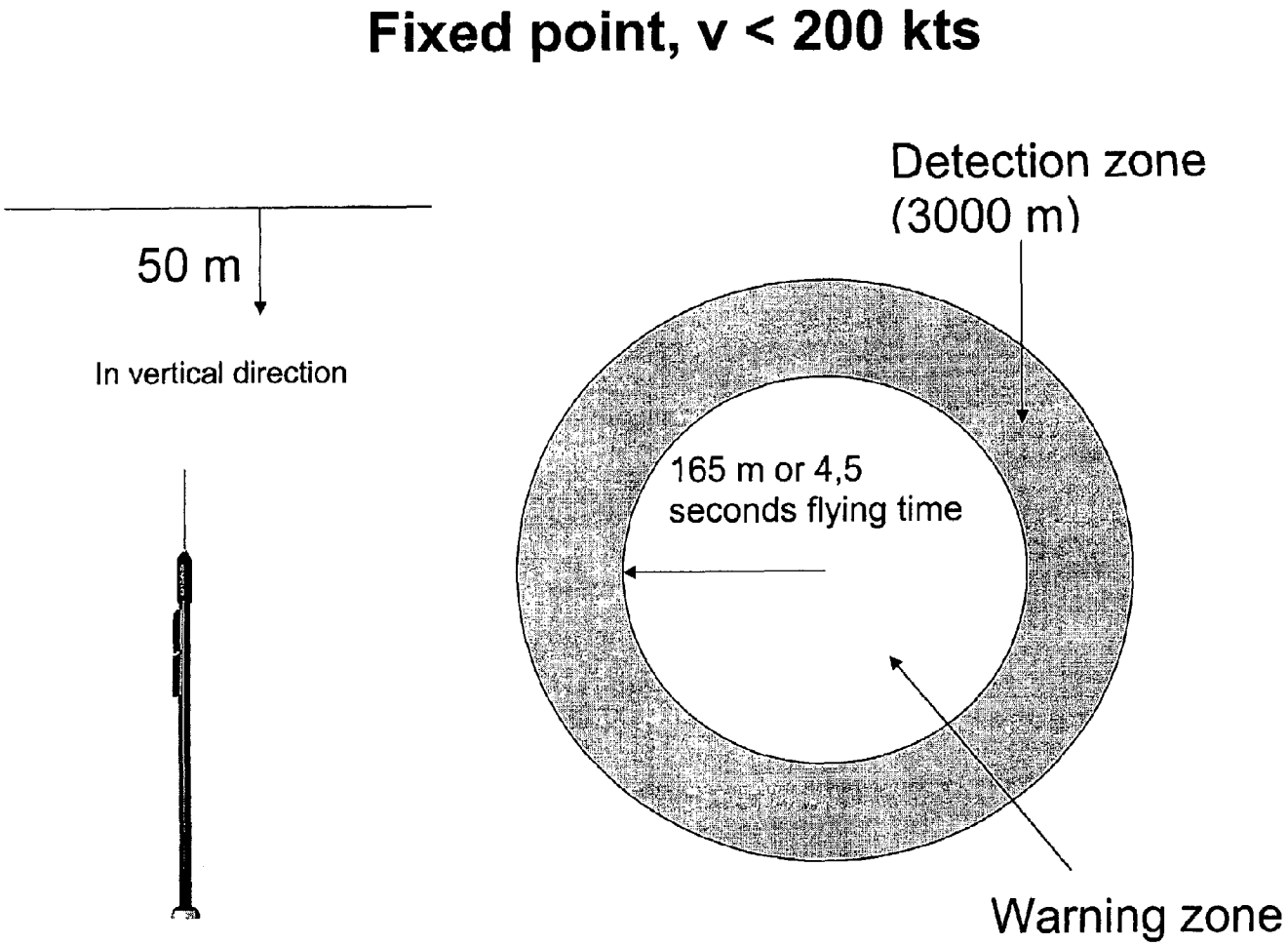
FIG. 7 is a schematic illustration of an example of detection and warning zones in an example of the utilisation of an OCAS system according to the invention to warn of a fixed point for aircraft travelling at a speed of less than 200 knots.

An OCAS system according to the invention is comprised of units which communicate with each other, and which also are arranged to communicate with a centre, for example an OCC=OCAS Control Centre. The status of OCAS field units can be monitored from an OCC, with reporting to, for example, NOTAM or a Web-page. The warning areas can be reprogrammed from the OCC, and OCAS field units can also be upgraded and have faults rectified therefrom.

Below there follows a short description of the main features of the functioning of the system. An OCAS field unit will typically be placed in the vicinity of an aerial obstacle of which the OCAS unit is to give warning. One of the said OCAS field units consists primarily of a radar device, a VHF radio, a power source and a mast.

A radar which is part of an OCAS system according to the invention is arranged to have low power consumption, and is constructed to seek continuously in its coverage area for moving aircraft. Upon detection of an aircraft, the radar is arranged to follow the aircraft as a defined target. The course, height and speed of this target are computed and registered in the OCAS field unit. The OCAS field unit is provided with a device that follows the registered course, height and speed, and is arranged to activate a warning to enable the pilot to manoeuvre safely away from the aerial obstacle if the target's course, height and speed are of such character that there is a danger of collision with the aerial obstacle.

The VHF radio of an OCAS field unit, which is an integral part of a system according to the invention, permits the remote control of warning lights, audio warning signals and communication within a network of OCAS field units.

The OCAS field unit is designed for low power consumption, and will typically be supplied with power from batteries and/or solar panels. This mode of power supply renders the field unit self-sufficient in energy and independent of power supply from a mains network. As a supplement to the power supply from batteries and solar panels, the OCAS field unit may be provided with a power supply unit or a connection for the mains network, which permits operation even if batteries or solar panels should not be capable of supplying the necessary electric power. A power supply solution of this kind will advantageously give low running costs and simplified installation and operation in remote, accessible locations.

An OCAS field unit will typically be mounted on a mast. The mast which is a part of an OCAS system according to the invention is flexibly constructed of modules to facilitate transport. Thus, it is simple to assemble, and a whole OCAS field unit is so constructed and its materials are so selected that the unit is resistant to harsh climatic conditions. Furthermore, the mast and the OCAS field unit are designed and constructed in accordance with modem environmental requirements, and thus blend into the surroundings and permit optimal positioning of the radar. An OCAS system according to the invention has a number of operating modes, of which one keeps the actual radar unit in operation to continuously monitor the radar's coverage area, whilst the other parts of the system "sleep". With the radar in operating mode, this coverage area is defined by two warning zones. The two warning zones are a warning zone for a light signal and a warning zone for an audio signal. In the case of aircraft that are detected in the light signal warning zone, an OCAS system according to the invention activates a light signal mounted on or close to the aerial obstacle to aid the aircraft operator's or pilot's visual detection of the obstacle situation. If, despite the light signal warning in the first warning zone, the aircraft does not make any evasive manoeuvre, but continues its journey into the second warning zone, an acoustic signal that is given via a VHF radio is activated. The audible warning signal given via the VHF radio is characteristic, distinctive and easy to recognise, and is transmitted on all relevant VHF frequencies to aircraft within the VHF radio's range. A VHF radio, or a radio operating on other frequency bands, and which is a part of an OCAS system according to the invention, is provided with a programming device so that some frequencies can be defined so as not to carry the sound warning.

A radar device in an OCAS system according to the invention includes a radar signal processing unit which determines whether a detected object is within the defined detection area, and within the defined warning zones. Detection areas and warning zones are defined through the programming of the processing unit and by the actual coverage area of the radar, so that the warning zones are limited in the vertical plane. Typically, such a limitation in the vertical plane for an OCAS system according to the invention will be defined so that objects, or targets, which are, or will come, at a height of less than 50 meters above the highest point of the associated aerial obstacle trigger a warning.

The radar system in an OCAS system according to the invention is arranged to determine whether a target has a course and height that may result in the target colliding with the aerial obstacle if the identified course and height are maintained. If the target's course and height are of such a character, the light warning will be activated when the target is in the warning zone. The warning zone will thus be partly defined by means of the target's speed and direction, and is given an area in accordance with these factors in order to activate a warning in good time before a potential collision happens. The warning time is thus calculated to help the pilot see the obstacle and manoeuvre away from the obstacle to avoid collision.

A light warning may, for example, be a stroboscopic light which flashes about 40 times per minute.

An acoustic warning via a VHF radio may typically be a signal that is transmitted with a duration of 5.5 seconds, and which alerts the aviator to the fact that he is in the vicinity of an aerial obstacle.

An OCAS system according to the invention may also be provided with a device for following a target that is detected within the radar's range, and for following the target with a warning when the target enters a warning zone, but then desisting from giving new warnings if the target is slow-moving and is inside the warning zone for a long time. This is advantageous, for example, if it is necessary to carry out work on or in the immediate vicinity of an aerial obstacle, such as a power line, using a helicopter or other slow-moving aircraft. In such a case, the warning will be given in the usual way when the aircraft first enters the warning zone, but new warnings will not be given as long as the aircraft is inside the warning zone. Should the aircraft leave the warning zone and then re-enter it, a new warning, either a light or audio warning, will be activated as before.

An OCAS system according to the invention may include several OCAS field units. OCAS field units are provided with means of communication for communicating with each other, and can exchange information relating to a target detected within the field unit's range.

Optionally, an OCAS field unit according to the invention may be equipped with communication systems for communication with an OCAS operation centre, which, for example, may be located in already existing monitoring stations. OCAS monitoring will thus be another important part of system monitoring. From an OCAS operation centre, the technical and operational status of each OCAS field centre can be monitored, and a simple remote diagnosis can be made, possibly followed by fault rectification of The parts of the OCAS field unit that are designed for remote fault rectification. The possibility of remote monitoring, remote diagnosis and remote fault rectification will give low inspection costs compared with previously known manual inspection of systems, and will contribute to greater safety as a result of this possibility for real-time function reporting. The OCAS remote reporting capability allows the status of the system to be reported automatically to other units that are responsible for systems associated with the handling of air transport, and thus permits, for example, the state of the system to be made known to pilots and operators through notification via NOTAM.

Figure 11:
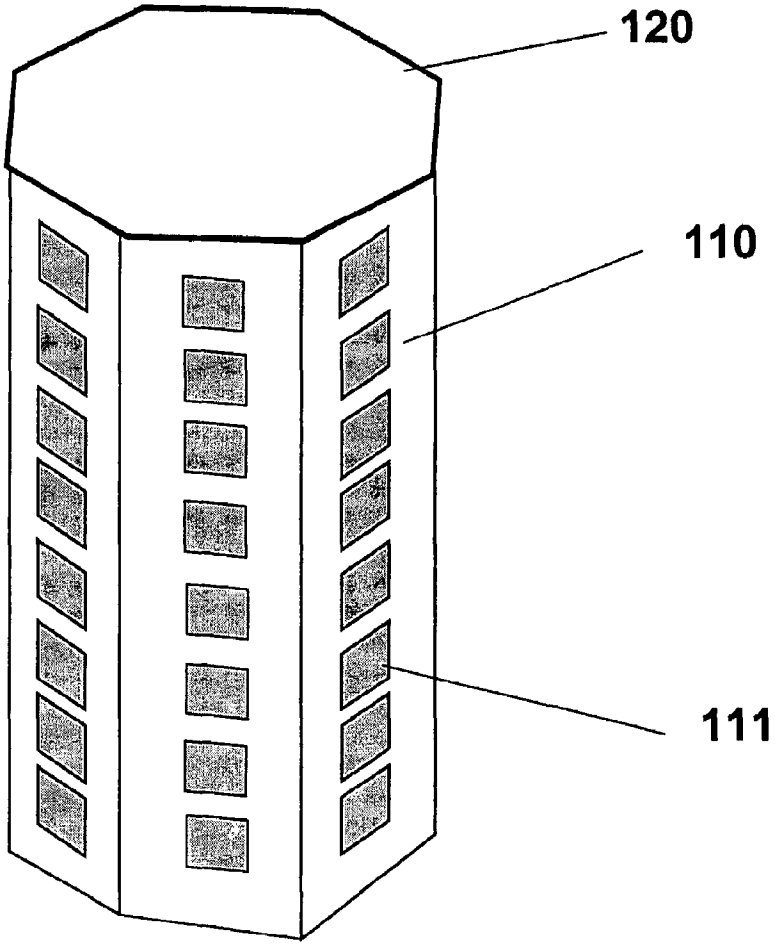
FIG. 11 shows an antenna configuration for a radar in an OCAS system according to the invention.

FIG. 11 shows an example of an embodiment of a preferred antenna solution for an OCAS radar antenna having eight antenna panels arranged as the sides of an octagon. During operation, the octagonal antenna 320 will be so positioned that each antenna panel 310 is arranged vertically with a "field of view" that exceeds ⅛th of the circumference, and due to an overlapping with adjacent panels, the assembly of eight panels will give a 360° coverage. Each antenna panel comprises a plurality of antenna elements 311 which are selected according to frequency, vertical coverage requirements etc.

Figure 8:
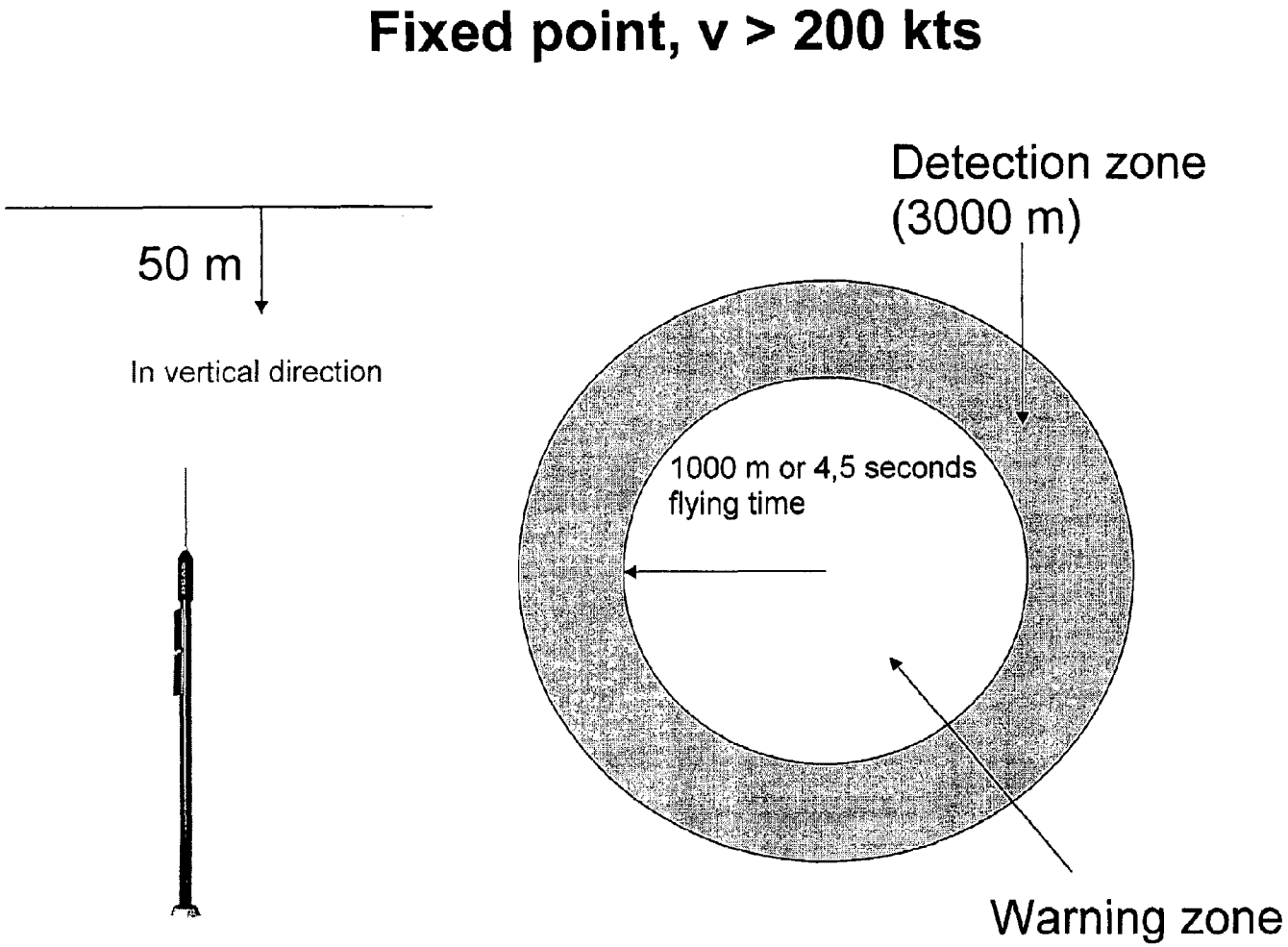
FIG. 8 is a schematic illustration of an example of detection and warning zones in an example of the utilisation of an OCAS system according to the invention to warn of a fixed point for aircraft travelling at a speed of more than 200 knots.
Figure 9:
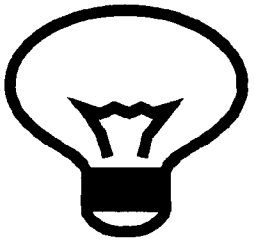
FIG. 9 indicates in principle two possible types of warning that can be components of an OCAS system according to the invention.
Figure 9:
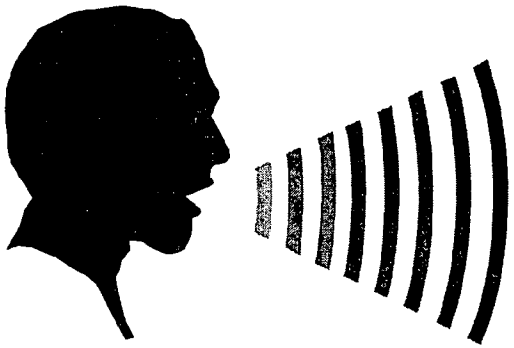
Figure 10:
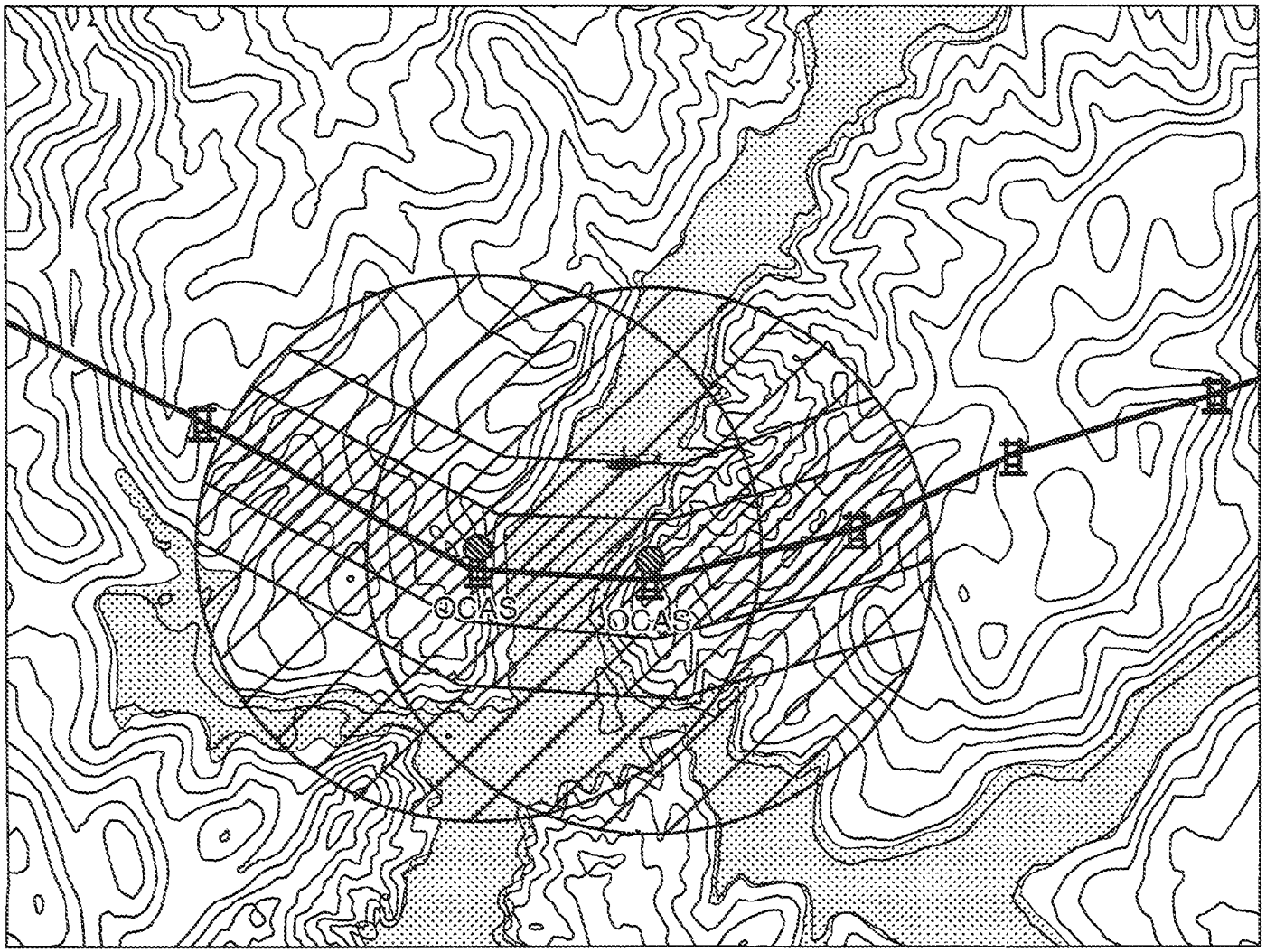
FIG. 10 is a general outline of a possible scenario involving an installation of an OCAS system according to the invention on a power line and detection and warning zones for an aircraft travelling towards the system installation.
Figure 12:
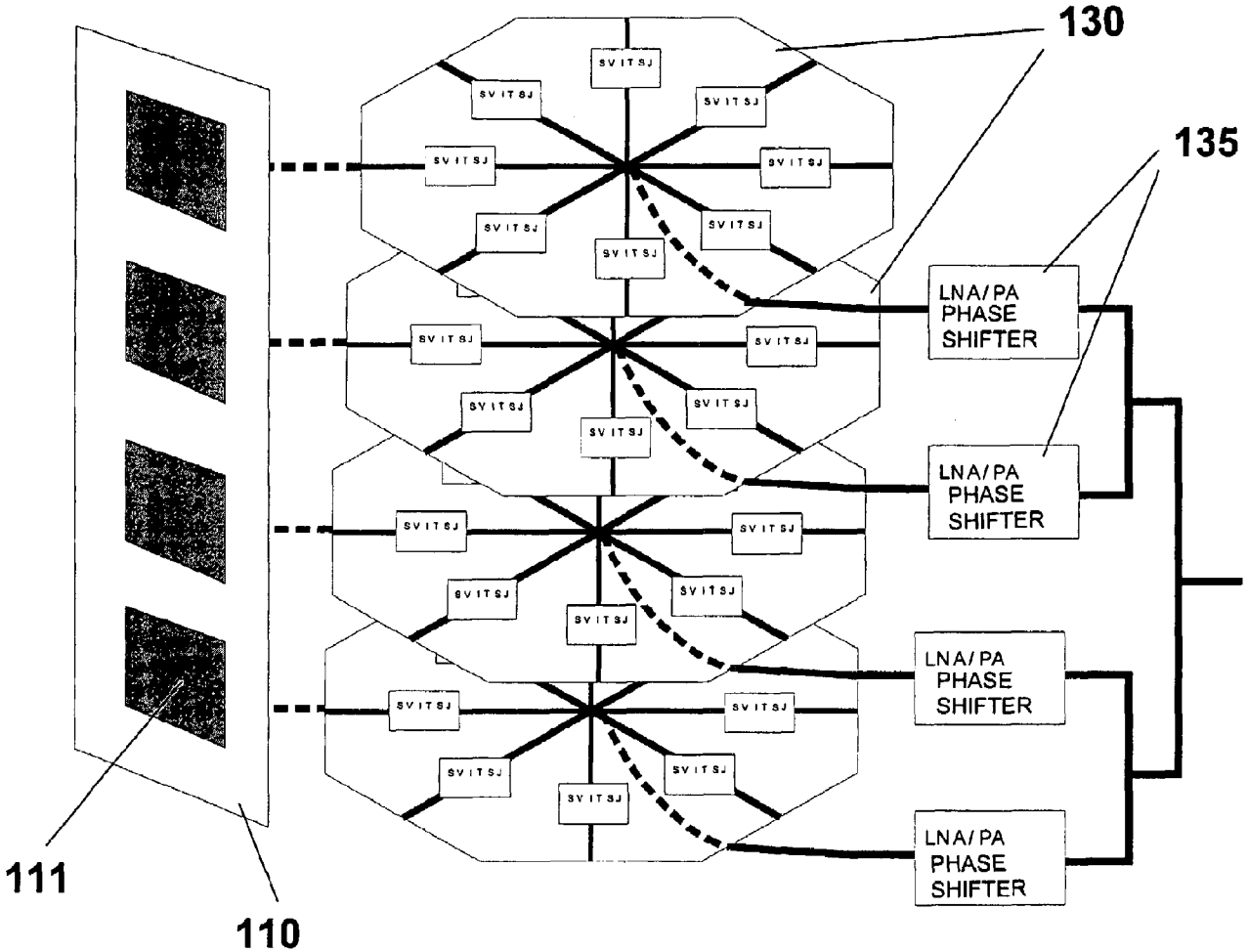
FIG. 12 is a more detailed schematic diagram of a radar antenna architecture as show in FIG. 11.
Figure 13:
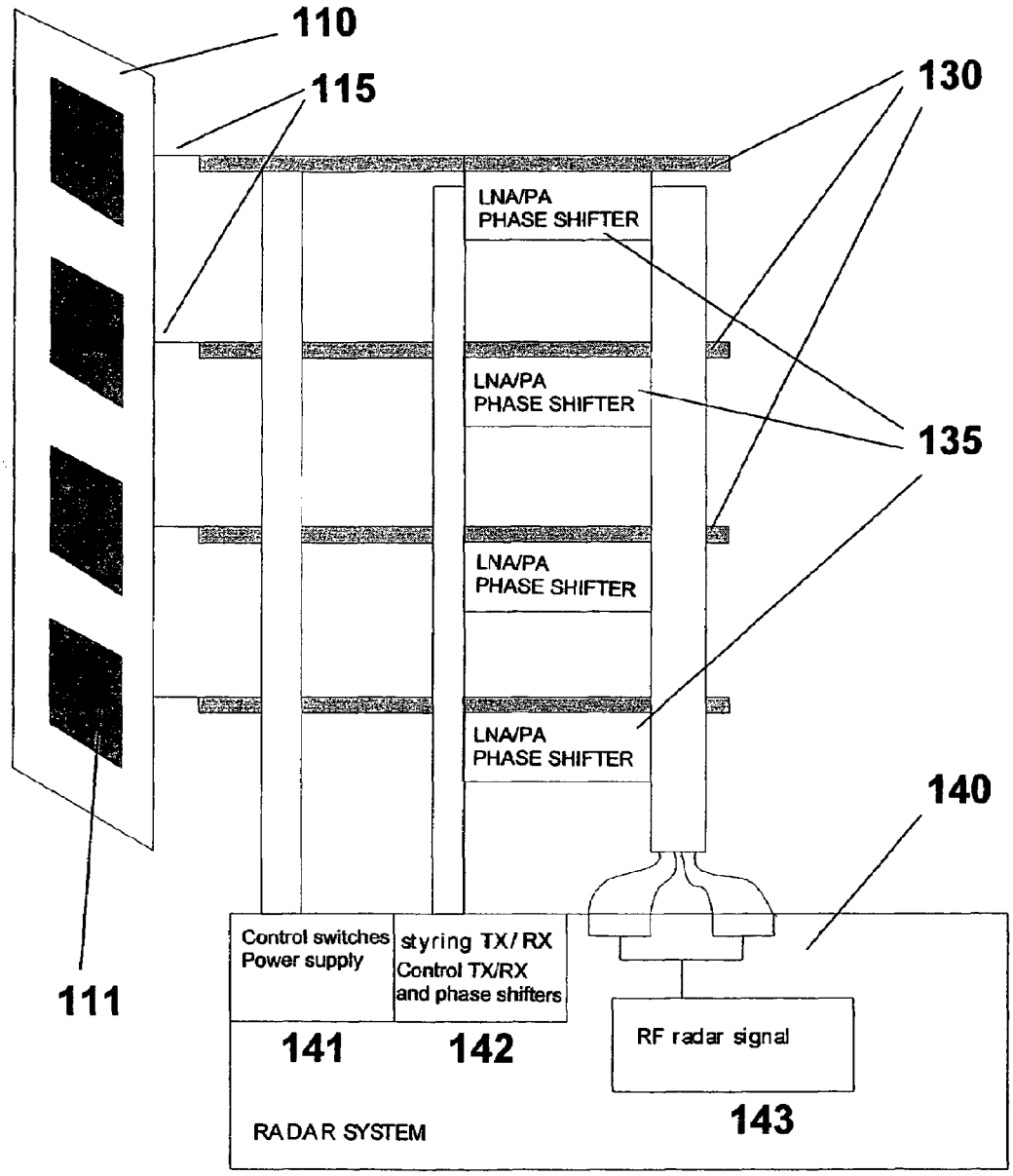
FIG. 13 is more detailed schematic diagram of an antenna architecture as shown in FIG. 11 with the addition of control and signal generation electronics.
Figure 14:
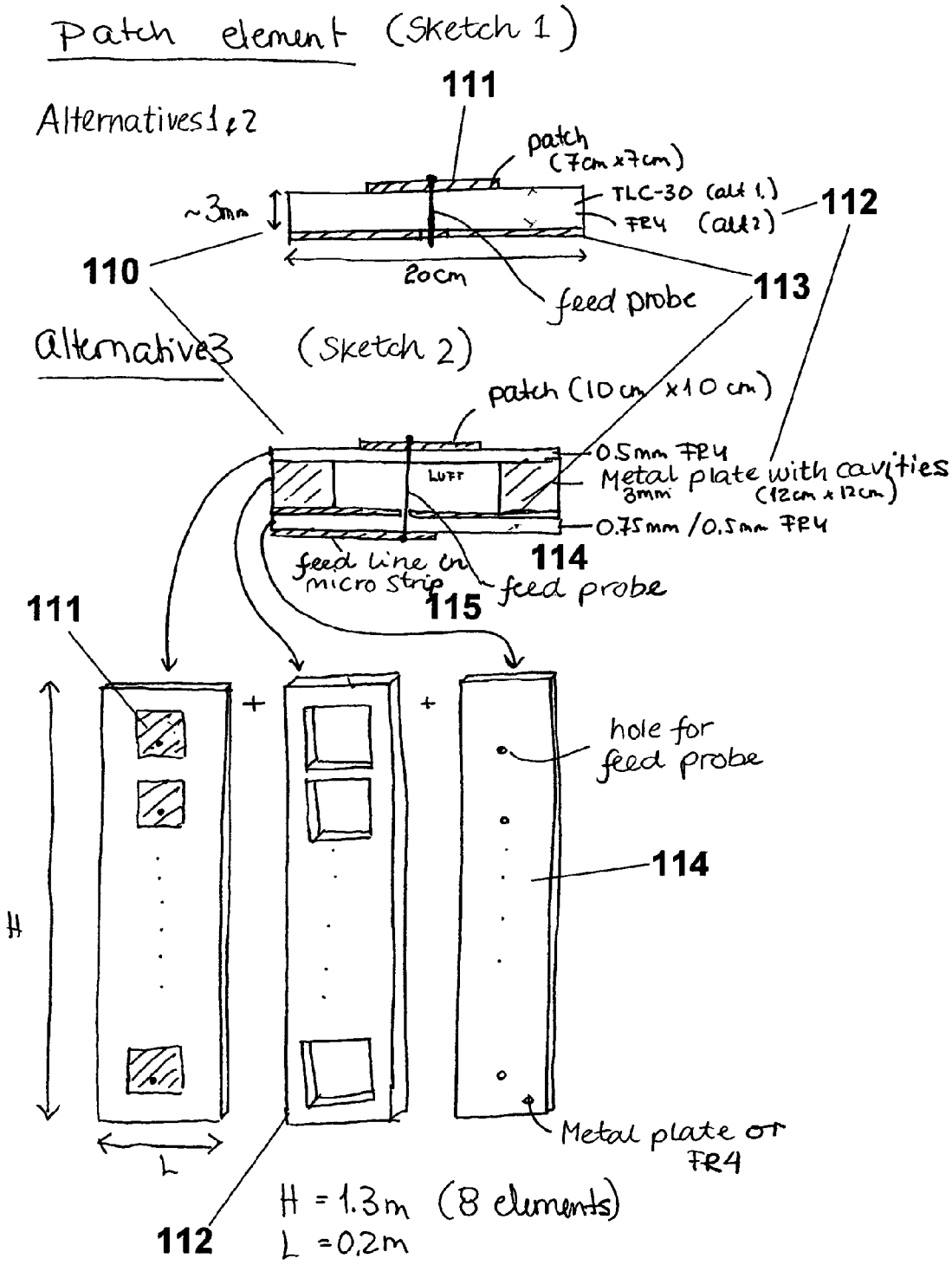
FIG. 14 is a schematic illustration of examples of antenna panel designs for an antenna architecture as shown in FIG. 11 or FIG. 12 for an OCAS solution according to the invention.

FIG. 12 is a schematic diagram of the architecture shown in FIG. 8, but with fewer antenna elements 311, where it is illustrated how the signals are carried to/from the antenna elements 111, through a combination of pin-diode switches and a radial splitter 130, and active modules 135 which comprise a low noise amplifier LNA, a power amplifier PA and a phase shifter, and also a network for combining the signals into one signal that is passed on to the actual radar system unit 140 containing radar signal generator and receiver 143, a unit for switch control and switch power supply 141 and a unit for TX/RX control and phase shift control with power supply 142, as indicated in more detail in FIG. 13. Alternatives for the design of an antenna element 110 are shown in FIG. 14. In alternative 1 the antenna panel is made of an elongate structure consisting of a reference plane 113, a dielectric layer 112 and a plurality of element areas 111. Antenna feed is carried out by the feed probe 114 which is passed through an opening in the reference plane 113, optionally, as shown for alternative 3, with connection to a feed line network laid on a dielectric layer placed on the reference plane on the side of the reference plane that is opposite to the position of the antenna element. A panel with a group of antenna elements is also shown in the lower part of FIG. 14, where a group antenna is outlined with a total of eight elements, of which the two uppermost and the lowermost are shown. A further detail of a layered structure as shown in FIG. 14 is shown in part by a split drawing in FIG. 15, where the split-up structure of the panel is s own in a side view, as an illustration of a possible feed network made in the form of a printed circuit on a circuit board which bears the reference plane on one side and the feed network on the opposite side. The conductor structure of the feed network is shown indicated by the reference numeral 115. The reference numerals 130/135 indicate, respectively, modules containing pin diode switches and radial splitter and active modules containing LNA, PA and phase shifter.

Figure 16:
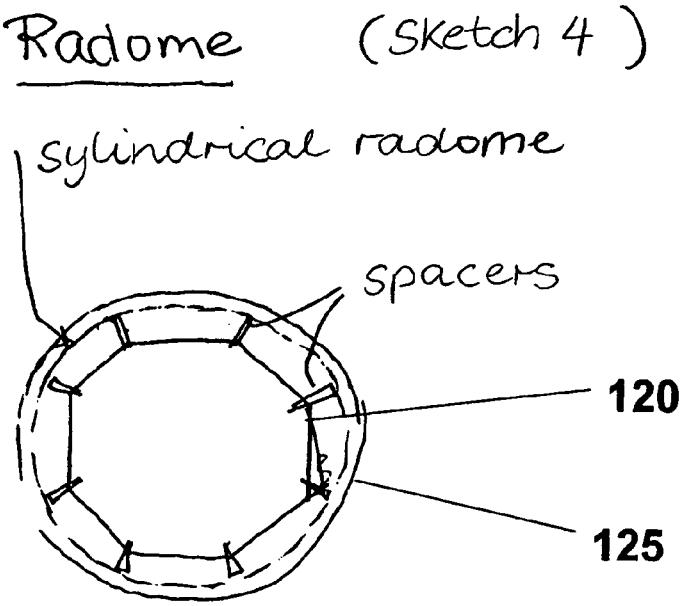
FIG. 16 is a schematic illustration of an almost cylindrical support frame and radome for an antenna architecture as shown in FIG. 11, 12 or 13, with a mounting suggestion for a favourable positioning of a non-directional VHF antenna.
Figure 16:
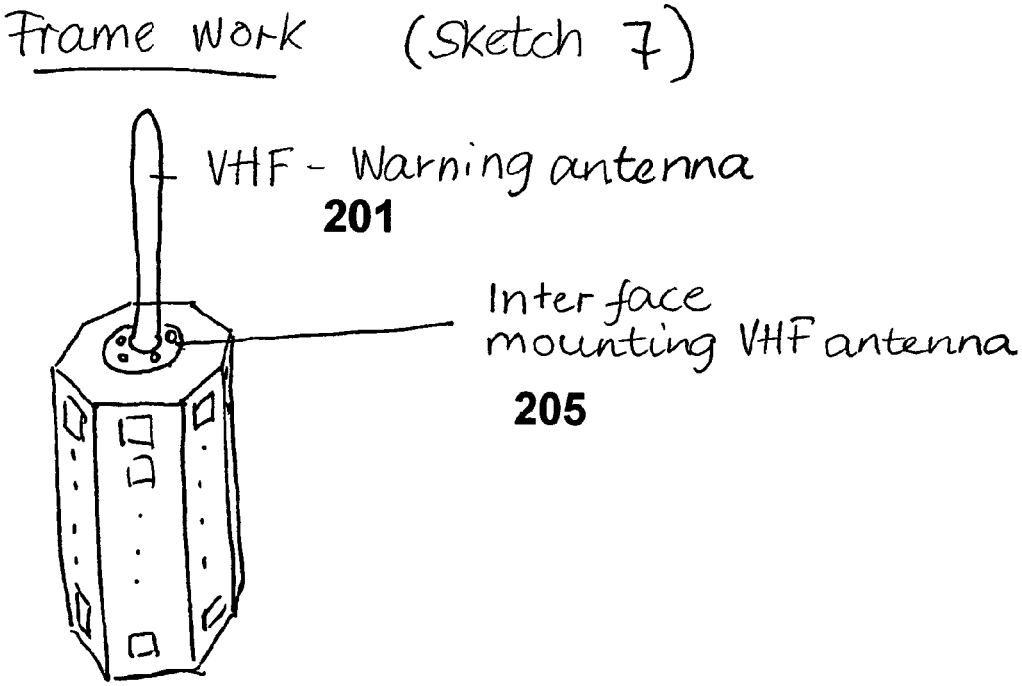

Details of a mechanical construction in an assembled antenna system which is suitable for the invention is shown in FIG. 16, including as shown in FIG. 11, a constellation of eight antenna panels arranged cylindrically in an octagonal cross-section, where the antenna panels are mounted on an octagonal framework with centrally located interface 205 at one end with mechanical fixing means for a VHF antenna 201. In the upper part of FIG. 16, indicated in sketch 4, it is shown how a cylindrical radome can be placed over the octagonal framework to provide environmental protection of the antenna panels.

Figure 17:
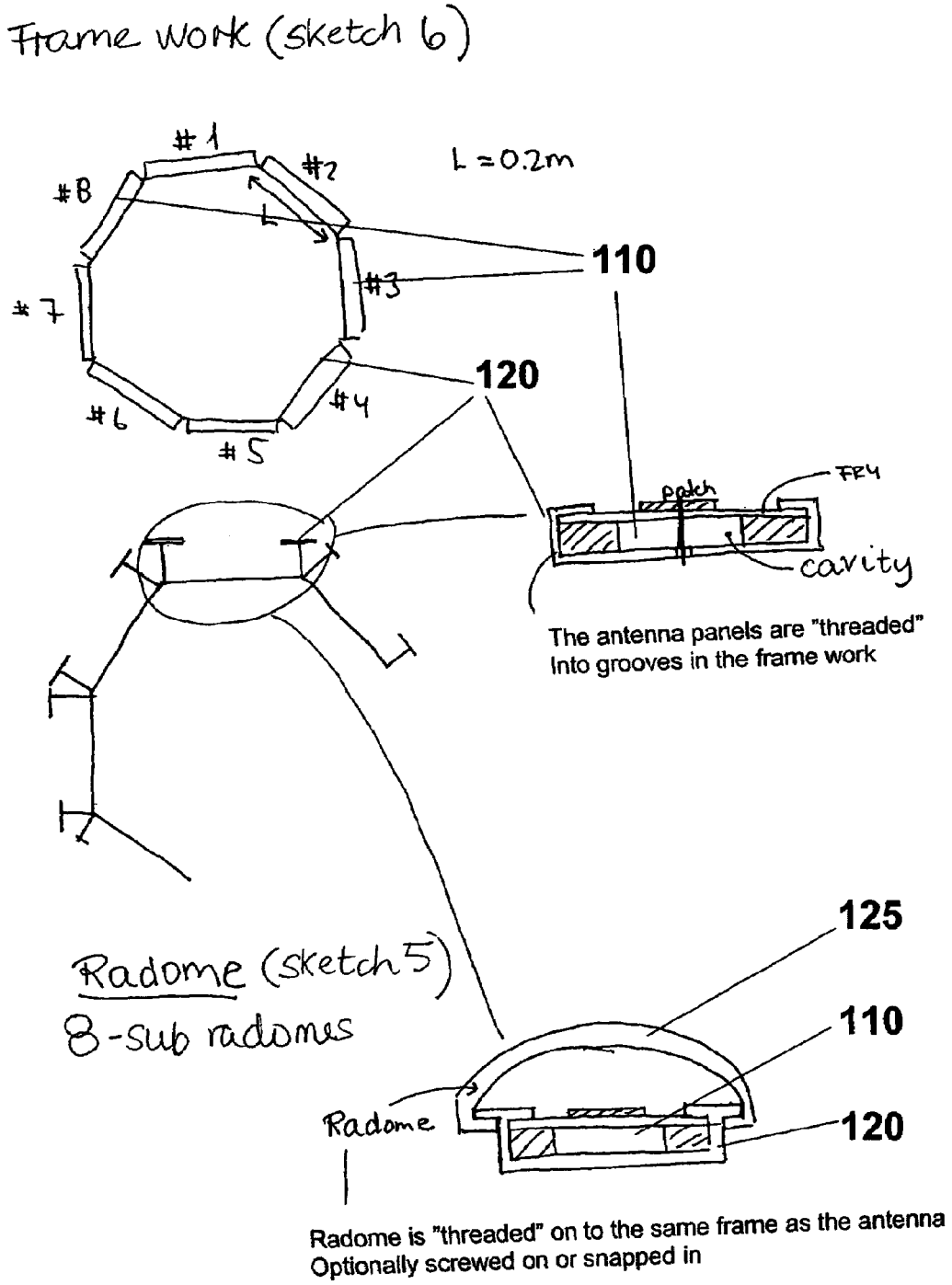
FIG. 17 is a schematic illustration of more details of the support frame in an antenna architecture as shown in FIG. 11, 12, 13 or 16, where each individual antenna panel is covered by a panel radome for an OCAS solution according to the invention.

The framework construction is shown in more detail in FIG. 17, with the framework 120, and a possible arrangement of an antenna panel 110 in a respective longitudinal slot in the frame structure, and at the bottom of FIG. 17, an alternative radome structure is shown which permits individual radome protection of the antenna panel 110. Below there follows a more detailed description of a specific exemplary embodiment of a radar antenna that is suitable for use in the present invention.

First, let us discuss the calculation of the physical size of the antenna. The radar system is assigned a frequency of around 1.3-1.5 GHz (information from KITRON 10 Sep. 2001). The wavelength is then 4=c/f=22.3–23.1 cm. This makes it possible to determine the mechanical external dimensions of the antenna. Based on an operational frequency of 1.325 GHz, the diameter of the antenna is estimated to be about 50 cm. Including a surrounding cylindrical radome, the external diameter will be about 65 cm. The height of the antenna will be determined by the number of elements per column which will be clarified in the specification phase of the development. With eight elements per column, the height of the antenna will be about 1.3 meters.

Below there follows a more detailed description of the structural design of the antenna as it is also outlined in the attached drawings. The antenna will consist of eight columns of radiating elements around a cylinder. The sub-project "Antenna" will comprise the design of the actual radiating element, active element pair and the group antenna with N elements in the vertical direction, including excitation/feed method. This will include integration of the antenna with feed line, which will be an interface with sub-project "Antenna interface". In coordination with sub-project "Antenna interface", a mechanical framework will be developed or proposed for the mounting of antenna modules and the boards which are a part of "Antenna interface". In addition, a radome will be specified both electrically and mechanically, adapted to the mechanical framework.

In what follows there is a description of structural details of an antenna element in an antenna panel for an antenna design as illustrated in the attached drawings. For eight elements in the vertical direction, the total height will be about 1.3 meters. The substrate requirement will then be about 8×1.3 m×0.2 m=2 $m^2$ per antenna.

The antenna itself will be a microstrip patch antenna, which we believe will give reasonable production costs due to the etching of a patch pattern. A microstrip patch antenna consists of a rectangular metal surface (=patch) that is etched out on one side of a substrate, whilst the other side of the substrate is metallized, and constitutes the patch ground plane. The patch antenna is fed via a probe that is drawn through the antenna ground plane and soldered to the patch itself.

Bandwidth requirements call for a minimum height between patch and ground plane. Preliminary calculations show that with a typical microwave substrate (TLC-30 from Taconix) a substrate thickness of about 3 mm is required. This is the alternative 1 embodiment as shown for example in FIG. 14.

The TLC30 substrate is regarded as a low-cost substrate for microwave frequencies. It is supplied with a one or two-sided copper coating. The price for a sheet is given as $370, or $330 per m2 (thickness 1.6 mm). For a large order, we can expect the price per sheet to be reduced by about 40%. This seems to be a costly solution where materials are concerned.

Alternative 2 embodiment: If FR4 material is used as a substrate for the patch antenna, a substrate thickness of about 3 mm is required. One side of the board is then mentallized (copper), whilst the other side consists of patches (etched pattern), such as that illustrated in FIG. 14.

The alternative 3 embodiment is shown in the illustration in FIG. 14, where the height between the patch and the ground plane may be air. This can then be realised in the form of air-filled cavities that are punched out of a metal plate, 3 mm thick (8 per antenna, with 8 cavities in the vertical direction). The actual patches can be etched out in a board of FR4 material, which can be glued or screwed to the cavity plate. FR4 material that is 0.5 mm thick has sufficient rigidity to maintain its shape across the cavities. The cavities may be round or rectangular. In the bottom of the cavities there is another metal plate which forms the ground plane for the patches. The ground plane may either be a metal plate with holes for the feed probes or a substrate (FR4) with corresponding holes in the metal layer for feed. The substrate may then be used for feed lines if all other boards are placed in the bottom of the antenna.

Alternative 3 is a preferred embodiment of an antenna panel for an OCAS marker, as it has cavities which give more advantages in terms of electromagnetics than alternatives 1 and 2.

Below there follows a discussion of an antenna interface that is suitable for the antenna discussed above. The antenna interface comprises a board and components on the signal path between the patch and the elements of the RF radar signal, as illustrated in FIG. 13. FIG. 12 shows that this consists of feed lines and switches out to each individual element from a 1:8 radial splitter. On the back of the radial splitter, we will place an active module consisting of TX/RX switches, LNA, PA and phase shifter. The signals from each of the active modules (as many modules of this kind as elements in the vertical direction) are then combined before the combined signal is passed into the radar transceiver. FIGS. 12-13 show that this is intended to be done on several boards. We envisage an embodiment on a FR4 substrate, where a closer study of the choice of substrate is a part of the main project. As input to this activity we would like information about expected tolerance on relative dielectric constant and substrate height for the FR4 substrate concerned. Etching tolerances are also of interest. For laying out microstrip lines we will probably use 0.75 mm substrate height as this gives 50 ohm characteristic impedance at line widths of about 1.4 mm.

Figure 15:
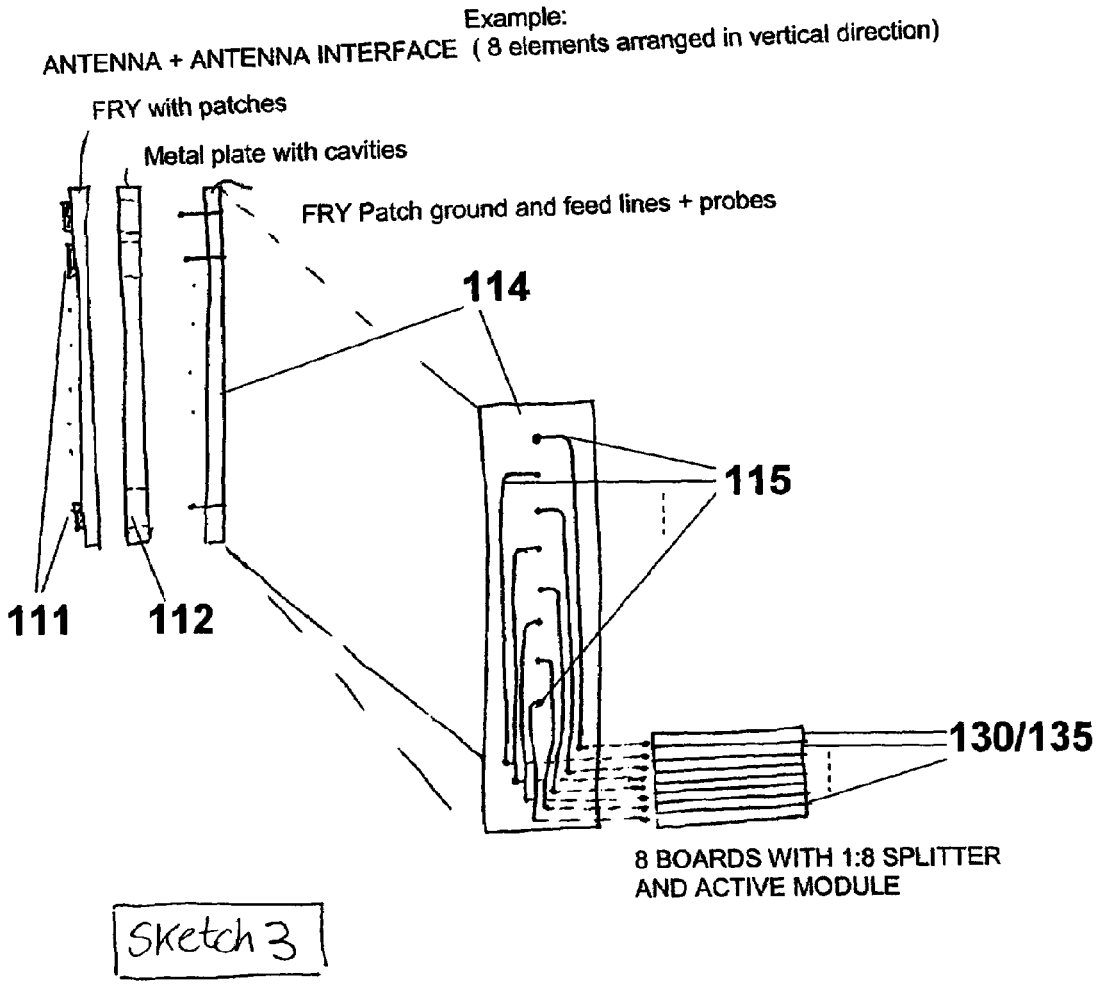
FIG. 15 is a schematic illustration of an example of a feed network for antenna panel designs for an antenna architecture as shown in FIG. 10, 11 or 12 for an OCAS solution according to the invention.

To make mounting and maintenance easier, we will consider moving all boards to the bottom of the antenna. This will give longer feed lines out to the patch elements, which gives increased loss etc. The feed lines can then be placed on the back of the FR4 substrate which functions as an ground plane for the patches as illustrated in FIG. 15.

Below there follows a description of radome solutions for protection of the antenna panels against impact from the surroundings. The radome can be integrated in a number of ways. In our original proposal, the radome is a large cylinder having an external diameter of about 65 cm, which is "threaded" onto the antenna. An alternative to this is one radome per antenna panel (8). See the sketch on a separate sheet. The rest of the electronics must then be protected in another way. See FIG. 16 or 17.

In the following features of an advantageous framework structure for securing and positioning antenna panels are described. The framework will form a mechanical frame for the integration of antenna panels (8) and boards from the "antenna interface" and radome, as outlined for example in FIGS. 16 and 17.

To summarise, an OCAS marker according to the invention consists primarily of a radar system connected to a central processing unit, to which there is also connected a light system and a radio system for transmission of the warning signal. The marker also includes a power supply system with an electric power generator of the solar cell type or wind generator type, and a back-up battery, and possibly also a connection to power supply from a nearby mains network. Where several OCAS markers are to work together in one network, systems for internal communication whereby the OCAS markers can exchange information about target movements within their coverage area and operational status information are included in order to establish a continuous chain of OCAS markers, and to ensure communication and warning beyond that which could be provided by a single marker. A typical OCAS marker field unit is mounted on a tubular mast structure 700 formed by three tubular mast structural members, respectively a bottom tube 730, a central tube 720 and a top tube 710, where the top tube 710 includes a mounting interface for attachment of a cylindrical or segmental radar antenna.

What is claimed is:

[1. A field unit for warning of a danger of collision between an aircraft and an obstacle, in particular a topographical ground obstacle or an obstacle formed by a mast, building or aerial cable structure, characterised in that it comprises:

a multi-part tubular mast having a fixing device on one side face for a solar panel and a fixing device at an upper end for a radar antenna; an elongate radar antenna arranged vertically in the longitudinal direction and having a plurality of antenna panels and provided with an environment-protective casing, which radar antenna is in communication with radar electronics to form a radar system for synthesized radar detection of an aircraft in a radar coverage area; a central processing unit in communication with the synthesized radar detection radar system for processing information from the radar system, which information includes at least one indication of direction and several indications of distance or at least one indication of direction, one indication of distance and one indication of speed, and for identifying a radar system detected aircraft that is in a zone of the radar coverage area computed by the central processing unit as a collision danger area on the basis of the information;

a high-intensity light system connected to and controlled by the central processing unit for providing a high-intensity light warning signal, the light system being activatable by the central processing unit upon the detection of an aircraft in the collision danger zone; a VHF or UHF radio transmitter system connected to and controlled by the central processing unit for providing a radio signal modulated by an audible warning signal, the VHF or UHF radio transmitter system being activatable by the central processing unit upon the detection of an aircraft in the collision danger zone; and an electric power supply system comprising a solar panel secured to a fixing device, a chargeable back-up battery and a power supply control for power supply to the radar system, the central processing unit, the high-intensity light system and the VHF or UHF radio transmitter system.]

[2. A field unit as disclosed in claim 1, further comprising a position transmitting device based on the global positioning system GPS.]

[3. A field unit as disclosed in claim 1, further comprising a communication device connected to the central processing unit and arranged for communication with a similar second field unit, wherein the central processing unit is arranged to transmit to the second field unit information from the local radar system about the detected aircraft, and is arranged to receive from the second field unit information from the second field unit's local radar system about a detected aircraft and, on the basis of the information received, to activate the light system or the VHF or UHF radio transmitter system.]

[4. A field unit as disclosed in claim 1, wherein the detection zone is at least 3000 meters, and wherein a warning zone for the collision danger area is defined as an elongate area around an associated aerial obstacle extending to a distance from the aerial obstacle that corresponds to a flying time of preferably 15 seconds, and preferably not less than 4.5 seconds, on the basis of the aircraft's speed for an aircraft that is within a computed height of less than 50 meters below a defined obstacle height.]

[5. A field unit as disclosed in claim 1, wherein the detection zone is at least 3000 meters, and wherein a warning zone for the collision danger area is defined as a partly spherical area around an associated point obstacle extending to a distance from the point obstacle that corresponds preferably to a flying time of 15 seconds, and preferably not less than 4.5 seconds, on the basis of the aircraft's speed for an aircraft that is within a computed height of less than 50 meters below a defined obstacle height.]

[6. A field unit as disclosed in claim 1, wherein the light system includes at least one stroboscope light system.]

[7. A field unit as disclosed in claim 1, wherein the audible warning signal is a voice signal that gives information specifying the obstacle.]

[8. A field unit as disclosed claim 1, further comprising a remote monitoring system for reporting to an operation centre at least one operating state of the field unit, and optionally for control or remote maintenance of the field unit.]

[9. A field unit as disclosed in claim 1, wherein the central processing unit is arranged to activate the light system and/or VHF or UHF radio transmitter system preferably 15 seconds before a computed collision time on the basis of the detected aircraft's direction, distance and speed relative to the obstacle.]

[10. A field unit as disclosed in claim 1, wherein the light system is arranged to emit a flashing light with a repetition rate of about 40 flashes per minute.]

*11. An apparatus comprising:*

*a field unit for placement in the vicinity of an obstacle,*

*a central processing unit configured to receive course and height information from a detection system about a target approaching the obstacle, configured to identify when the target is entering a first and second warning zone in the vicinity of the obstacle computed by the central processing unit and configured to control a warning system to provide a first warning signal to the target when the target enters the first warning zone and a second warning signal to the target when the target enters the second warning zone.*

*12. The apparatus of claim 11, wherein the field unit provides for remote monitoring of the field unit from an operations centre.*

*13. The apparatus of claim 11, wherein the central processing unit activates a light system to provide the first warning signal.*

*14. The apparatus of claim 11, wherein the central processing unit activates a radio transmitter system to provide the second warning signal.*

*15. The apparatus of claim 14, wherein the radio transmitter system is included with the field unit.*

*16. The apparatus of claim 11, wherein the field unit is one of a plurality of field units having coverage areas and that are in communication to exchange information about target movements within the coverage areas and operational status information.*

*17. The apparatus of claim 11, wherein the field unit includes a radar system providing course and height information about the target to the central processing unit.*

*18. An apparatus comprising:*

*a field unit for placement in the vicinity of an obstacle including,*

*a central processing unit configured to receive course and height information from a detection system about a target approaching the obstacle, configured to identify a target entering a warning zone in the vicinity of the obstacle, and configured to control a warning system to provide a warning to the target when the target enters the warning zone, and desist from giving new warnings when the target stays inside the warning zone.*

*19. The apparatus of claim 18, wherein the field unit includes a radar system providing course and height information about the target to the central processing unit.*

*20. The apparatus of claim 18, wherein the central processing unit activates at least one of a light system and a radio transmitter system to provide the warning signal.*

*21. A method of warning a target of an obstacle comprising:*

*monitoring a coverage area in the vicinity of an obstacle using a field unit in the vicinity of the obstacle;*

*determining course and height information for a target in the coverage area;*

*calculating first and second warning zones based on the course and height information using a central processing unit;*

*providing a first warning to the target, when the target enters the first warning zone;*

*providing a second warning to the target, when the target enters the second warning zone.*

*22. The method of claim 21, wherein providing the first warning includes providing the first* warning to the target using a light system activated by a central processing unit in the field unit.

*23. The method of claim 21, wherein providing the second warning includes providing second warning to the target using a radio transmitter system activated by a central processing unit in the field unit.*

*24. The method of claim 21, wherein determining includes performing synthesized radar detection of the target to determine at least one of, at least one indication of direction and several indications of distance, and, at least one indication of direction, one indication of distance and one indication of speed.*

*25. The method of claim 21, wherein:*

*the providing a first warning to the target, includes providing a first warning by activating a light system to provide at least one flashing visible light in the vicinity of the obstacle; and,*

*the providing a second warning to the target, includes providing a second warning by activating a radio transmitter to provide an audible warning to the target in at least one of the UHF and VHF radio frequency bands.*

*26. The method of claim 25, wherein the audible warning is provided in a plurality of frequencies.*

*27. The method of claim 25 further comprising configuring a light system and a radio transmitter to be in a sleep mode when not activated.*

*28. The method of claim 21, further comprising desisting from providing warnings when the target is inside the warning zone.*

*29. The method of claim 21, wherein,*

*monitoring includes providing at least first and second field units in communication to exchange information about target movements within respective coverage areas and operational status information; and,*

*exchanging information between the field units relating to the target detected within the coverage areas.*

*30. The method of claim 21, further comprising:*

*communicating with other similar field units for remote activation of at least one of light and audio warnings in the similar field units.*

*31. An aircraft collision avoidance system comprising:*

*a field unit for placement in the vicinity of a ground obstacle including,*

*a radar system having a radar coverage area; and*

*a central processing unit in communication with the radar system for processing information from the radar system about aircraft in the radar coverage area, and for identifying aircraft entering a first and second warning zone of the radar coverage area computed by the central processing unit on the basis of the information;*

*a light system activated by the central processing unit to provide a light warning signal upon the identification of the aircraft entering the first warning zone; and,*

*a radio transmitter system activated by the central processing unit to provide a radio frequency audible warning signal upon the identification of the aircraft entering the second warning zone.*

* * * * *